United States Patent
Khabiri et al.

(10) Patent No.: US 11,599,690 B2
(45) Date of Patent: Mar. 7, 2023

(54) WAFER ASSET MODELING USING LANGUAGE PROCESSING METHODS

(71) Applicant: INTERNATIONAL BUSINESS MACHINES CORPORATION, Armonk, NY (US)

(72) Inventors: Elham Khabiri, Briarcliff Manor, NY (US); Anuradha Bhamidipaty, Yorktown Heights, NY (US); Robert Jeffrey Baseman, Brewster, NY (US); Chandrasekhara K. Reddy, Kinnelon, NJ (US); Srideepika Jayaraman, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 16/933,972

(22) Filed: Jul. 20, 2020

(65) Prior Publication Data

US 2022/0019710 A1 Jan. 20, 2022

(51) Int. Cl.
*G06F 30/20* (2020.01)
*G06F 30/27* (2020.01)
(Continued)

(52) U.S. Cl.
CPC ......... *G06F 30/20* (2020.01); *G01N 21/9501* (2013.01); *G06F 40/40* (2020.01); *G06F 2111/10* (2020.01)

(58) Field of Classification Search
CPC ...... G06F 30/20; G06F 40/40; G06F 2111/10; G06F 2119/02; G06F 30/27; G06F 30/30; G01N 21/9501
See application file for complete search history.

(56) References Cited

U.S. PATENT DOCUMENTS 10,360,507 B2 7/2019 Aravamudan et al.
10,559,180 B2 * 2/2020 Pourmohammad ... H04W 4/021
(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Nghia M Doan
(74) *Attorney, Agent, or Firm* — Intelletek Law Group, PLLC; Gabriel Daniel, Esq.

(57) ABSTRACT

A computing device includes a processor and a storage device. A wafer asset modeling module is stored in the storage device and is executed by the processor to configure the computing device to perform acts identifying and clustering a plurality of assets based on static properties of a wafer asset using a first module of the wafer asset modeling module. The clustered plurality of assets is determined based on dynamic properties of the wafer asset using a second module of the wafer asset modeling module. Event prediction is performed by converting a numeric data of the clustered plurality of assets to a natural language processing (NLP) domain by a third module of the wafer asset modeling module. One or more sequence-to-sequence methods are performed to predict a malfunction of a component of the wafer asset and/or an event based on past patterns. Prediction information is stored in the storage device.

19 Claims, 11 Drawing Sheets

(51) Int. Cl.
*G06F 40/40* (2020.01)
*G01N 21/95* (2006.01)
*G06F 111/10* (2020.01)

(56) References Cited

U.S. PATENT DOCUMENTS

2003/0229410 A1* 12/2003 Smith ................. H01L 21/3212
                                                              700/109
2017/0200264 A1*  7/2017 Park ................... G01N 21/9501
2019/0354883 A1  11/2019 Aravamudan et al.

OTHER PUBLICATIONS

Elton, D. C. et al., "Using Natural Language Processing Techniques to Extract Information on the Properties and Functionalities of Energetic Materials From Large Text Corpora"; arXiv:1903.00415v1 [cs.CL] (2019); 10 pgs.

Baly, R. et al., "Wafer Classification Using Support Vector Machines"; IEEE (2012); vol. 25:2; pp. 373-383.

Khabiri, E. et al., "Industry Specific Word Embedding and its Application in Log Classification"; CIKM (2019); 9 pgs.

Young, T. et al., "Recent Trends in Deep Learning Based Natural Language Processing"; arXiv:1708.02709v8 (2018).

Qiu, X. et al., "Pre-Trained Models for Natural Language Processing: A Survey"; Research Gate (2020); 28 pgs.

Yang, H. et al., "Method and System for Prediction of Large Scale Conversion Rate (CVR) through Dynamic Transfer Learning of Global and Local Features"; IP.Com (2017).

Zhang, Z. et al., "Machine Reading Comprehension: The Role of Contextualized Language Models and Beyond" arXiv:2005.06249v1 [cs.CL] (2020); 51 pgs.

Garrett, Z. "Machine Learning to Predict Advertisement Targeting Solutions"; Technical Disclosure Commons, Defensive Publications Series (2017); 35 pgs.

List of IBM Patents or Patent Applications Treated as Related, 2 pgs.

* cited by examiner

200A

Input: Each wafer is going through thousands process_ids (steps) and a recipe is applied to it in each step

```
1  df_product = pd.read_csv("./data/XNXG_log_flt_20200303_171828.csv")
2  df_product.head()
```

203

| wafer | 1DPRESTRESS.1__1 | 1DPRESTRESS.XM2__1 | 1DPRESTRESS.XM2__2 | 1DPREST |
|---|---|---|---|---|
| 0 HFJKC001TMC7 | NaN | | | NaN |
| 1 HFJKC005TMC0 | NaN | 'WET/PUB/BEOL/LGW03.L1bAH2mF6aL.PrD.0__L1bAH2mF6aL.PrD' | | |
| 2 HFJKC006TMD1 | NaN | NaN | NaN | |
| 3 HFJKC009TMA0 | NaN | NaN | NaN | |
| 4 HFJKC010TMD1 | NaN | NaN | NaN | |

205 → PDID
210 → Recipe
215

5 rows × 2984 columns

```
1  print ("Total number of wafers:", len(df_product))
```
Total number of wafers: 686

Total vocabulary size: 660

The index related to value 'WET/PUB/BEOL/LGW03.L1bAH2mF6aL.PrD.0__L1bAH2mF6aL.PrD' is: 649 in the vocabulary

1 get_clustered_wafers(all_wafers, n_clusters=3)

Number of all wafers in cluster_0 318
['HFJ6C001TMC7' 'HFJ6C006TMC0' 'HFJ6C011TMA0' 'HFJ6C029TMB5'
 'HFJ6C030TME6']
------------
Number of all wafers in cluster_1 92
['HFJ6C160TMC5' 'HFJ6C161TMG7' 'HFJ6C162TMD6' 'HFJ6C164TME7'
 'HFJ6C165TMB6']
------------
Number of all wafers in cluster_2 276
['HFJ6C008TMD1' 'HFJ6C009TMA0' 'HFJ6C010TMD1' 'HFJ6C012TME2'
 'HFJ6C013TMB1']

410

1 get_closest_wafers("HFJ6C055TMF4", bottomk=10)

[('HXF01139FKE4', 0.1065993578030828),
 ('HXF01215FKH1', 0.10989017850900672),
 ('HXF01217FKA7', 0.10989017850900672),
 ('HXF01161FKG1', 0.11573112791187776),
 ('J72A0160FKD3', 0.11891489986306383),
 ('J72A0161FKA2', 0.11891489986306383),
 ('J72A0184FKH2', 0.11891489986306383),
 ('J72A0185FKE1', 0.11891489986306383),
 ('J72A0186FKB0', 0.11891489986306383),
 ('J72A1025FKA4', 0.11957436196351948)]

415

1 get_closest_wafers("HFJ6C055TMF4", topk=10)

[('HFJ6C055TMF4', 1.0000000000000004),
 ('HFJ6C052TMA1', 0.5149329584190723),
 ('HFJ6C054TMB2', 0.504095670504926),
 ('HFJ6C053TME3', 0.48992974679857265),
 ('HFJ6C051TMD2', 0.4898997347619079),
 ('J1780009FKD6', 0.4559432409705737),
 ('J1780010FKG7', 0.44594703060311713),
 ('HFJ6C062TME5', 0.4449293508033665),
 ('J1780213FKD1', 0.43707959795416207),
 ('HFJ6C057TMG5', 0.42479766582558887)]

FIG. 4

- Total wafers: 686
- Total pdid_recipe: 1189
- Number of common pdid_recipe for the top 10 good wafers: 81

- For each good wafer, what are the closest wafers based on categorical values

- Number of common pdid_recipe for the bottom 10 wafers: 99
- Subtract the Pdid_recipe for bad wafers from good ones: 30

Optimize pdid_recipe for "good" wafers

```
{'CMPMGM2ILD CMP.XM__1#CMP/PUB/BEOL/CU/CTC01.RP3KMG90.job.0__RP3KMG90.job',
 'CMPMGTaNCMP1.XM__1#CMP/PUB/BEOL/CU/MNC02.3AP_25S.job.0__3AP_25S.job',
 'CMPMpMRAM.XM__1#CMP/PUB/BEOL/CU/MNC02.3AP25sP3.job.0__3AP25sP3.job',
 'DISPOEOL.1__1#DISPO.CCBankInSort.1__CCBankInSort',
 'FINPEX25.XM__1#INS/PRIV/BEOL/CTF04/CHB.FINPEX25.0__FINPEX25',
 'INSMAGM2ILD.XM__1#INS/PRIV/BEOL/CTF09/CHB.ANTSICOH5500B.0__ANTSICOH5500B',
 'INSMAGM2ILDHM.XM__1#INS/PRIV/BEOL/MNF02/CHC.LDRPTEOS500C.0__LDRPTEOS500C',
 'INSMAGR1TEOSHM.XM__1#INS/PRIV/BEOL/MNF02/CHC.LDRPTEOS400C.0__LDRPTEOS400C',
 'LTHMAGV1.XM__1#LTH/PUB/BEOL/CGX01/XMG.IPSV1.1__IPSV1',
 'LTHTGL02Zp5MMEBR.XM__1#LTH/PUB/FEOL/TGL02/IBM.IBM/2p5MMEBR.1__IBM/2p5MMEBR',
 'MEAGMILDD.XM__1#MEA/ALERIS.MAGILDDEP.XM__MAGILDDEP',
 'MEAMAGILDCuCMP.XM__1#MEA/ALERIS.MAGM2CUCMP.XM__MAGM2CUCMP',
 'MEAMGINBKR1EH.XM2__1#MEA/ALERIS.MAGSIN40ENCAP.XM__MAGSIN40ENCAP',
 'MEAMGAR1HM.XM__1#MEA/ALERIS.TEOSTaN.0__TEOSTaN',
 'MEASCATMMGMTJPSP.XM__1#MEA/PUB/OCD/MMG.MMGMTJPSTCAPPTL.1__MMGMTJPSTCAPPTL',
 'MEAmRsMAGMpCMP.XM__1#MEA/PUB/BEOL/CTM21.MAGMpRsPOSTCMP.0__MAGMpRsPOSTCMP',
 'MTL300Ped.XM__1#MTL/PUB/BEOL/CTF03.CTF03ECA1BG00026.0__CTF03ECA1BG00026',
 'MTLMAGB1Mp.XM__1#MTL/PUB/BEOL/CTF03.CTF03EA1DBG00047.0__CTF03EA1DBG00047',
 'MTLMAGMTJHM.XM__1#MTL/PUB/BEOL/CTF03.CTF03EA1D1BG0023.0__CTF03EA1D1BG0023',
 'MTRCDDEVMAGV1.XM__1#MTR/PUB/CD/REC.XMGV1DPOR.1__XMGV1DPOR',
 'MTRCDFINMAGB1.XM__1#MTR/PUB/CD/REC.XMGB1FPOR.1__XMGB1FPOR',
 'MTRCDFINMAGM2.XM__1#MTR/PUB/CD/REC.XMGM2FPOR.1__XMGM2FPOR',
 'MTROVLMAGV1.XM__1#MTR/PUB/OVL/RECIPE.V1M1XMG0001DPOR5.1__V1M1XMG0001DPOR5',
 'MTROVLYMAGR1.XM__1#MTR/PUB/OVL/RECIPE.R1E1XMG0204DPOR5.1__R1E1XMG0204DPOR5',
 'RIEMGMTJHMO.XM__1#RIE/PUB/BEOL/LGE07.RIER2HM006QP1.1__RIER2HM006QP1',
 'RIESiNEB.XM__1#RIE/PUB/BEOL/LGE07.RIESIN170V11P1.1__RIESIN170V11P1',
 'WETpostSiNEB.XM__1#WET/PUB/BEOL/CNW07.BCH4DCu1F30s.0__BCH4DCu1F30s',
 'WetMGB1CuRemova.XM__1#WET/PUB/BEOL/CNW07.BCH8AN3mDC.0__BCH8AN3mDC',
 'WetMGsacSiNremov.XM__1#WET/PUB/BEOL/CNW07.BCH4F150sDC1m.0__BCH4F150sDC1m',
 'mSETCTM35.XM__1#MEA/CTM35.24FW2P.0__24FW2P'}
```

FIG. 5

WAFER ASSET MODELING USING LANGUAGE PROCESSING METHODS

BACKGROUND

Technical Field

The present disclosure generally relates to asset modeling in IoT domains, and more particularly, to predict the behavior of assets using natural language processing.

Description of the Related Art

There are typically two types of data available for assets modeling: (1) Static assets, such as the make, model, and manufacturing information, etc., and (2) dynamic assets, such as the operational data, sensors, and alarms. Dynamic assets have the ability to indicate when a failure may occur, and based on their characteristics, it can be determined whether a dynamic asset is "good" or "bad."

Both static and dynamic assets can be grouped into coherent clusters according to their characteristics. Dynamic assets can lack structure and can be grouped according to certain techniques. For example, dynamic assets can be grouped together based on certain characteristics in the areas of security, lifecycle management, and operational needs.

When dynamic data has alarms, there would be a benefit to predict failure (both catastrophic and non-catastrophic) if failure events or target events could be anticipated before alarms are activated, or a hard failure occurs. Such predictive capability would also provide an explanation for the behavior of assets based on the history of behavior, to permit the prediction of good assets, and would permit corrective action to reduce waste and costs.

SUMMARY

According to one embodiment, a computing device includes a processor, and a storage device. A wafer asset modeling module is stored in the storage device, and is executed by the processor to configure the computing device to perform acts identifying and clustering a plurality of assets based on static properties of a wafer asset using a first module of the wafer asset modeling module. The clustered plurality of assets is determined based on dynamic properties of the wafer asset using a second module of the wafer asset modeling module. Event prediction is performed by converting a numeric data of the clustered plurality of assets to a natural language processing (NLP) domain by a third module of the wafer asset modeling module. One or more sequence-to-sequence methods are performed to predict a malfunction of a component of the wafer asset and/or an event based on past patterns. Prediction information is stored in the storage device. The generation of the prediction information can be provided to a user of an additional monitoring system, to take corrective action prior to a failure of operations. Additional benefits include providing an entity or user with the prediction information to determine a root cause of alarms and/or events, and in the case of semiconductor wafers, to modify a manufacturing process and reduce waste by determining which semiconductor processes and recipes are "good" or should be eliminated/changed.

In one embodiment, the static properties of the assets include static data including one or more of a make, model, and manufacturing information of each of the assets. The dynamic properties of the assets include dynamic data including one or more of operational data, sensor data and alarm data; and the third module is configured to convert one or more of the static data and the dynamic data to the NLP domain by finding word representations using at least one of a Bag-of-Words model, a term frequency-inverse document frequency (TF-IDF), or a word vectorization.

In one embodiment, the numeric data is converted from an Internet of things (IoT) domain to the NLP domain by creating a word embedding model of the numeric data performing at least one of a cluster analysis, a difference measurement analysis, or a predictive model development.

In one embodiment, the rating of the one or more assets determined by the second module comprises a description based on a conditional characteristic.

In one embodiment, the numeric data is converted from a semiconductor domain to the NLP domain by creating a word embedding model of the numeric data of a semiconductor wafer fabrication, and wherein the second module is configured to determine a rating of a plurality of semiconductor wafers according to a recipe process.

In one embodiment, the word embedding model of the numeric data is created using at least one of a Bag-of-Words (BOW) model, a term frequency-inverse document frequency (TF-IDF), or a word vectorization.

In one embodiment, one or more of the plurality of semiconductor wafers is rated as one of good or bad according to the determined rating of the recipe process.

In one embodiment, the third module is further configured to create the word embedding model of the numeric data to use the BOW model to determine BOW vectors by creating rows and columns of the numeric data, wherein each row represents a semiconductor wafer, and each column represents a count of a particular recipe that is identified as being used in a respective wafer.

In one embodiment, the third module is further configured to create the word embedding model of the numeric data by the TF-IDF to create rows and columns, wherein each row represents a semiconductor wafer, and each column represents a count of a particular recipe that is identified as being used in a respective wafer, and wherein a numerical value is assigned to each recipe according to a uniqueness of the recipe compared to other recipes used. wherein each row is a wafer, each column is a recipe, and a numerical value is assigned to each recipe according to a uniqueness of the recipe compared to other recipes used.

In one embodiment, a computer-implemented method for wafer asset modeling using natural language processing, the method clustering a plurality of wafer assets based on static properties of a wafer includes static data including one or more of a make, a model, or a manufacturing information of each of the wafer assets. A rating of one or more assets of the plurality of wafer assets is determined based on dynamic properties, wherein the dynamic properties include dynamic data including one or more of operational data, sensor data, or alarm data. A target event or a failure event is predicted by converting a numeric data of the plurality of the wafer assets to a natural language processing (NLP) domain. One or more sequence-to-sequence methods are performed to predict alarms and target events based on past patterns.

In one embodiment, one or more of the static data and the dynamic data are converted to the NLP domain by finding word representations using at least one of a Bag-of-Words model, a term frequency-inverse document frequency (TF-IDF), or a word vectorization.

In one embodiment, the numeric data is converted from an Internet-of-things (IoT) domain to the NLP domain by creating a word embedding model of the numeric data performing at least one of a cluster analysis, a difference measurement analysis, or a predictive model development.

In one embodiment, the determining of the rating of the one or more assets is based on a conditional characteristic.

In one embodiment, a word embedding model of the numeric data of a semiconductor wafer fabrication is created by converting the numeric data from a semiconductor domain to the NLP domain, and determining a rating of a plurality of semiconductor wafers according to a recipe process.

In one embodiment, one or more of the plurality of semiconductor wafers is rated as one of good or bad according to the determined rating of the recipe process.

In one embodiment, for each good wafer of the plurality of semiconductor wafers, there is a determining of the closest wafers based on categorical values.

In one embodiment, a method for identifying candidate root causes of differences in a semiconductor wafer's features includes determining one or more identifying elements of the semiconductor wafer's production history by creating a word embedding model of the production history elements. A subsequent analysis of the word embedding is performed, including at least one of a cluster analysis, a difference measure analysis, and or a predictive model development; and a root candidate root causes of differences in the semiconductor wafer's features are identified.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2A illustrates an application applied to a semiconductor domain, consistent with an illustrative embodiment.

FIG. 4 illustrates lists of the top closest wafers and bottom closest wafers, consistent with an illustrative embodiment.

FIG. 5 shows an optimized process IDs for "good" wafers, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

As used herein, the term "event" is used to refer to an action or an occurrence detected by an application. Events can include user actions, or system occurrences that can require a system response. For example, low memory conditions, excessive retry operations, may all be considered as error events and/or failure events depending on the severity of the issue. Target events include scheduled operations of an application.

As discussed herein in various illustrative embodiments, the computer-implemented method provides for the clustering of assets based on static properties, and takes into consideration the dynamic properties of the clustered assets. An advantage if such asset modeling is that failure prediction and event prediction is facilitated. In the domain of wafer asset modeling, the production of semiconductor wafers is facilitated in part by determining whether various recipe processes should be considered "good" assets or "bad" assets. Thus, the production of semiconductor wafers can be increased in terms of better efficiency in manufacturing with reduced defects.

The computer-implemented system and method provide for an improvement in the efficiency of computer operations. For example, by virtue of the teachings herein, the improvement resulting in a reduction in the amount of processing power, as well as a reduction in the use of computer memory. Language processing is used to label elements from a production history to create a word embedding model that provides for a more efficient wafer manufacturing process than known before. By clustering "good" assets of wafers models, the wafers can be determined as being "good" (or "bad") based on the recipe used, without performing measurements on the wafers. A benefit in cost reduction and production quality results.

EXAMPLE ARCHITECTURE

Figure 1:
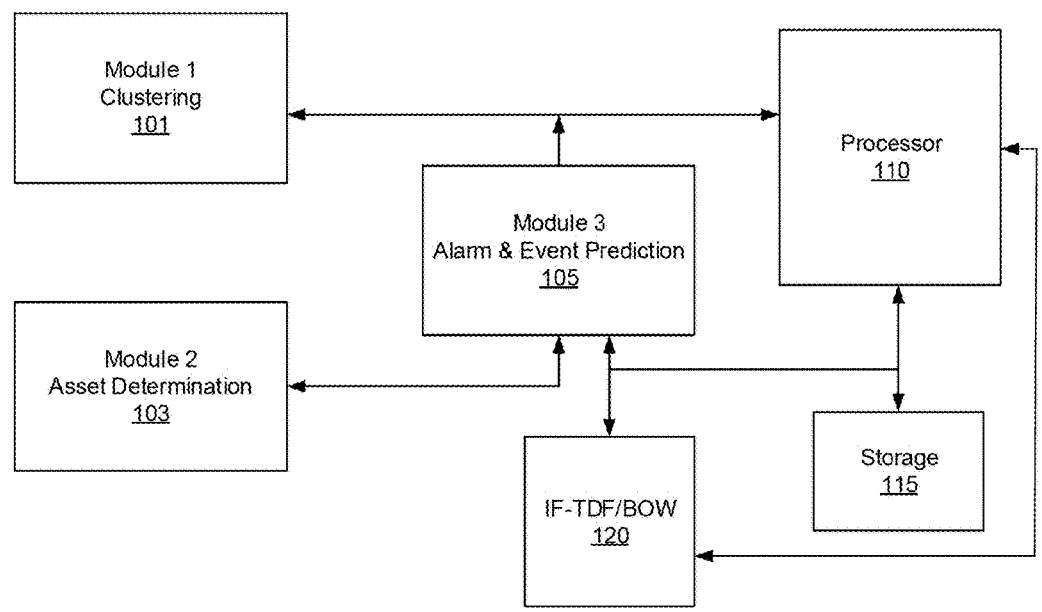
FIG. 1 is an illustration 100 providing an overview of an architecture of a computer device configured for asset modeling using language processing methods, consistent with an illustrative embodiment.

FIG. 1 is an illustration 100 providing an overview of an architecture of a computer device configured for asset modeling using language processing methods, consistent with an illustrative embodiment.

For example, in FIG. 1 there are three modules shown, a clustering module 101 (e.g., first module), an asset determination module 103 (e.g., second module), and an alarm and event prediction module (105 e.g., third module). It is to be understood that the modules are shown to facilitate understanding of their operations, and there can be more modules or fewer modules than shown and described herein. A processor 110 is coupled to the modules 101, 103, and 105, and can control the operation of the modules 101, 103, and 105. Storage 115 is coupled to the processor 110. A language processing module (TD-IDF/BOW) 120 operating in conjunction with the third module 105 can store and process various language processing operations in conjunction with the module 105. Language processing operations to perform word representations using, for example at least one of a Bag-of-Words model, a term frequency-inverse document frequency (TF-IDF), or a word vectorization can be performed by the third module 105 in conjunction with the third module 105.

In an illustrative embodiment, the first module 101 is configured to perform clustering of assets based on static properties (make, model and manufacturing information, and in the case of semiconductor wafer fabrication, recipes).

The second module 102 is configured to perform a rating of assets that are conditional on operational properties (e.g., dynamic). In the case of semiconductor wafer fabrication or testing, the second module may determine what are "good" assets and "bad" assets.

The third module 103 can be configured to perform natural language processing of dynamic and static assets, and to predict future "events"/"alarms", for example, converting into language domain a numerical data in the events/alarms and perform sequence2sequence methods. Sequence2sequence is a supervised learning algorithm that uses recurrent neural networks (RNN) and convolutional neural networks (CNN) to map a sequence in one domain to a sequence in another domain. The third module 105 can use the clusters generated by the first module 101 to aid in event predictions. The third module 105 can be used for applications that support optimal process learning, and to diagnose problems in asset quality.

FIG. 2A illustrates in 200A an application directed to a semiconductor domain, consistent with an illustrative embodiment. As shown in FIG. 2A, as each wafer goes through thousands of process-ids (steps), a recipe is applied in each step. A column 203 identifies the wafer, and as shown Wafer 1 has a PDID 205 circled as "1DPREST" and a recipe 210 that is a magnified value at reference 215. TD-IDF vectors can also represent the wafer.

Figure 2B:
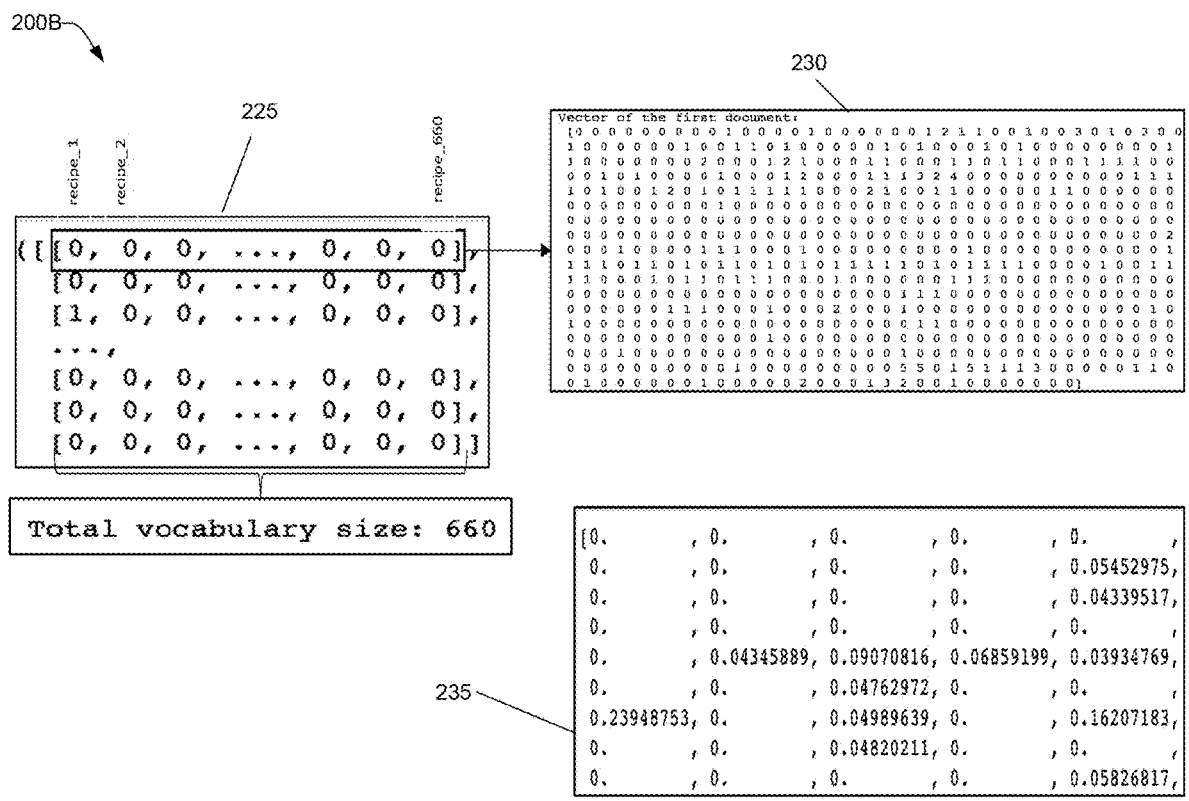
FIG. 2B illustrates a wafer representation and a wafer recipe displayed as vectors, consistent with an illustrative embodiment.

FIG. 2B illustrates in 2B00 a wafer representation and a wafer recipe displayed as vectors, consistent with an illustrative embodiment. The wafer representation may use Bag-of-Words, in which each row is a wafer and each column is a recipe. As shown in the list of recipes 225, if the recipe is not in the wafer a zero is placed in the row. However, if the recipe is used in the wafer, the number of times it was found is placed in the row. A vector representation at 230 is shown for the "vector of the first document" that is to be converted to the language domain. Box 235 shows groups of numbers representing recipes. With regard to the wafer representation, it is noted that conventionally all the wafers are measured to determine whether they were good or bad. However, in the present illustrative embodiment, semiconductor wafers can be deemed to be good or bad by identifying whether the process used in the manufacture is "good" or "bad", saving time and resources spend on actual measuring of the wafers.

Figure 3:
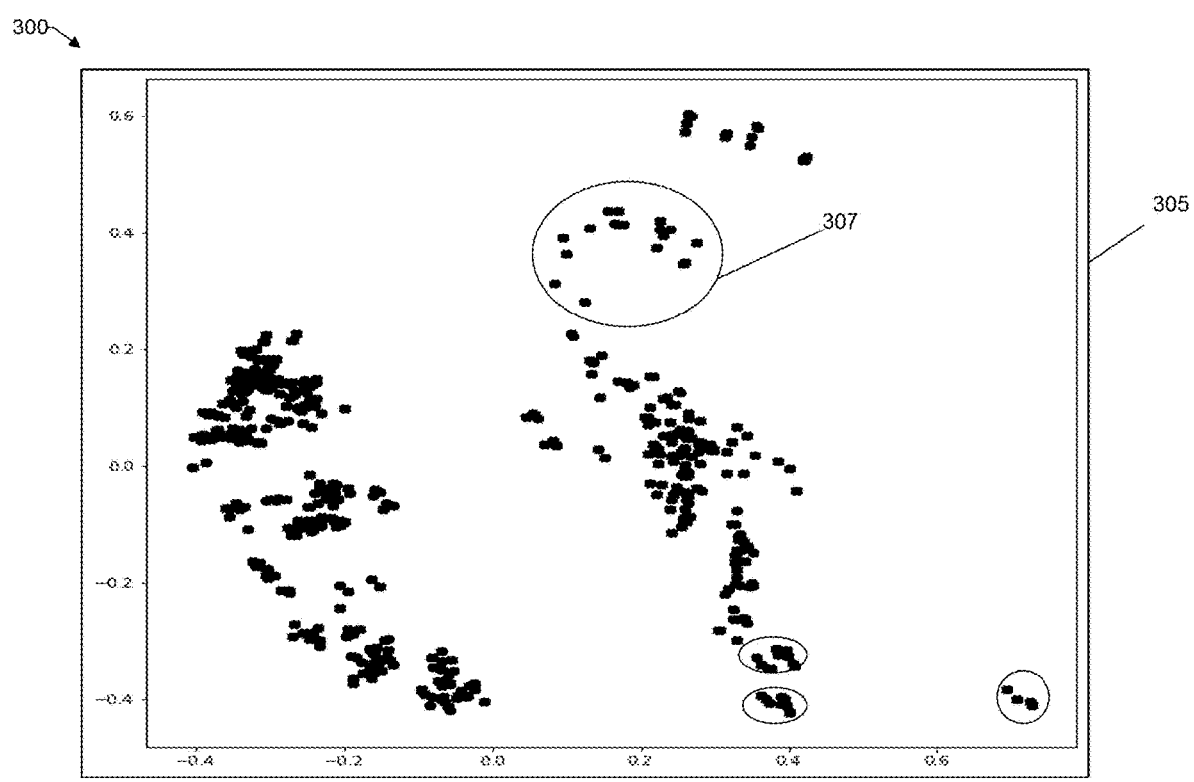
FIG. 3 illustrates wafer clustering using TF-IDF, consistent with an illustrative embodiment.

FIG. 3 illustrates in image 300 of wafer clustering using TF-IDF, consistent with an illustrative embodiment. While the wafer cluster can be performed using TF-IDF, as shown in elements 307, 308, and 309, the data is more separable in TF-IDF, as opposed to using BOW.

FIG. 4 illustrates lists of the closest wafers 405 in terms of ratings, consistent with an illustrative embodiment. The bottom closest wafers 410 and the top closest wafers 415 are grouped. In FIG. 4, it can be seen which are the clusters of similar wafers (the number of clusters is a parameter), FIG. 5 shows an optimized process IDs ("pdids") for "good" wafers, consistent with an illustrative embodiment. Item 505 is a list of the optimized process id recipes for "good wafers". In this drawing, the total wafers were 686, and the total pdids. The process for the top 10 "good" wafers is 81, and the number of common recipes for the bottom ten wafers is 99.

Example Processes

With the foregoing overview of the example architecture, it may be helpful now to consider a high-level discussion of an example process. To that end, in conjunction with FIGS. 1, 2A, 2B, and 3, FIG. 6 is a flowchart 600 for monitoring a wafer fabrication process in the semiconductor domain using language processing, consistent with an illustrative embodiment, and FIG. 7 is a flowchart of a method 700 of asset modeling using language processing, consistent with an illustrative embodiment. Processes 600 and 700 are illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 6:
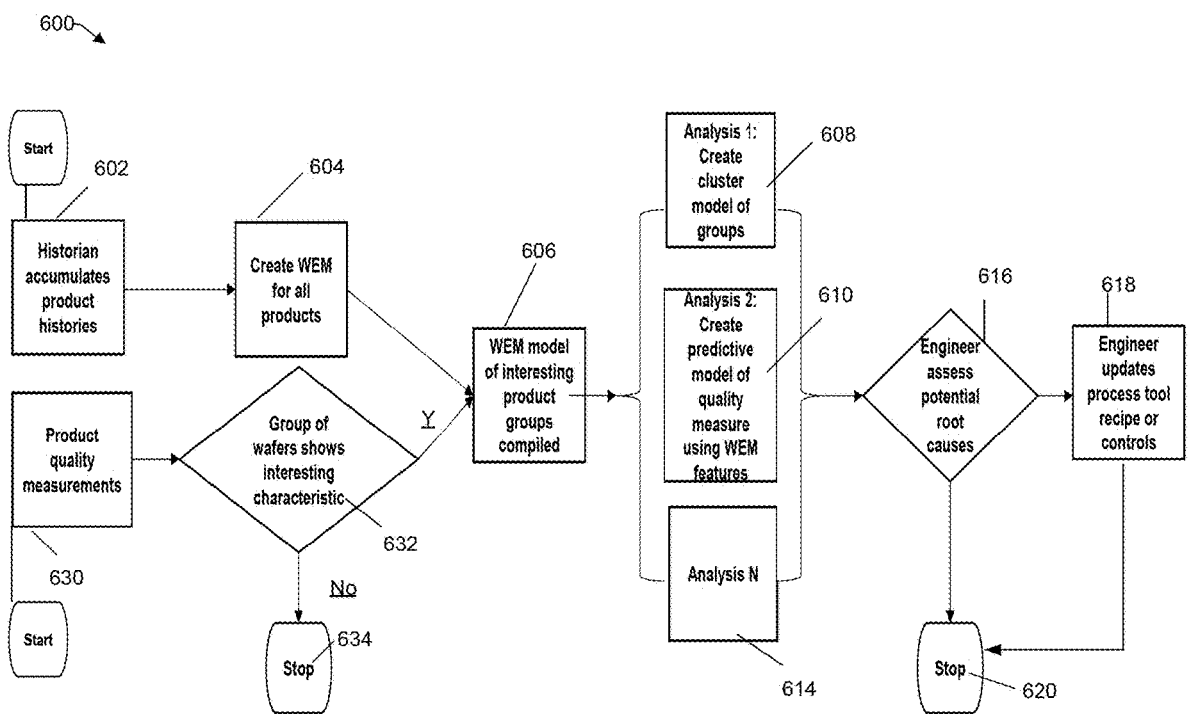
FIG. 6 is a flowchart for monitoring a wafer fabrication process in the semiconductor domain, consistent with an illustrative embodiment.
Figure 7:
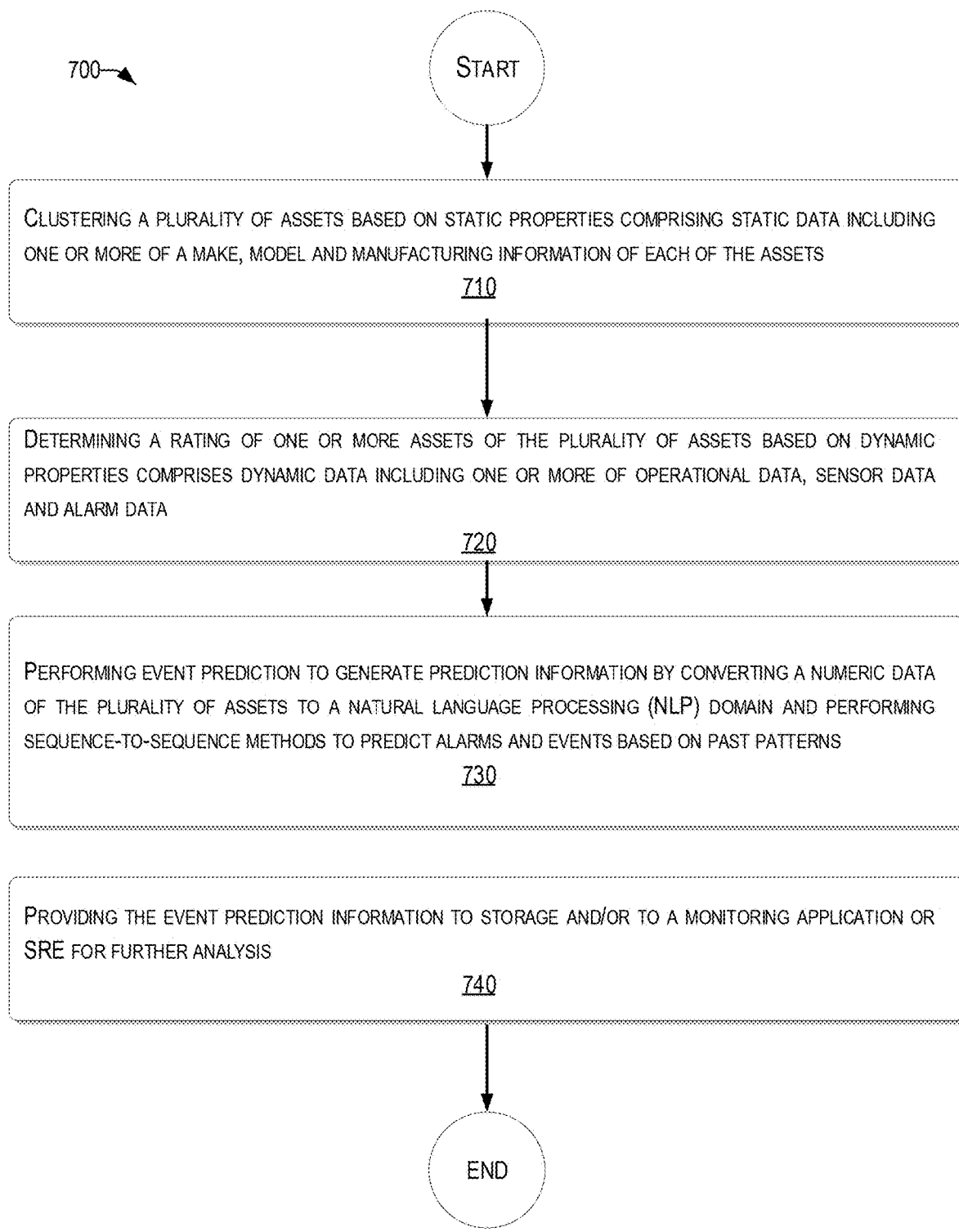
FIG. 7 is a flowchart of a method of asset modeling using language processing methods, consistent with an illustrative embodiment.

It is shown in FIG. 6 that some operations may occur in parallel, and/or can occur in an overlapping time period. At operation 602, an electronic historian function can accumulate product histories. Such histories can be assistive in a clustering operation of products.

At operation 604, the third module 105 creates a word embedding model (WEM) of the wafers for all the products to be monitored.

Occurring in parallel with operation 602, at operation 630 product quality measurements are obtained. For example, one type of measurement may have been made to the semiconductor wafers. At operation 632, the first module 103 determines whether one or more groups of wafers based on a particular or uncommon characteristic (e.g., extremely high yield) are present by using an application such as ID-TDF (or BOW) to convert numeric data into a semiconductor domain. If there are no particular or uncommon characteristics (No), this parallel path of the operation may stop at 634. However, if the determination at operation 632 is that there are particular characteristics, this information is provided for use in operation 606.

At operation 606, a WEM model is created based on the WEM created for all products in operation 604 and the groups of wafers showing interesting or particular characteristics in operation 632. For example, when groups of semiconductor wafers have been identified, as good (or bad) comparisons can be made with the accumulated histories, and analysis performed of the groups of recipe processes under consideration.

At operation 608, the clustering operations may be performed to create cluster models of the groups. The first module 101 can perform the clustering as discussed herein above. At operation 610, predictive model quality measures using the WEM features is performed. The third module 105 may perform this operation as discussed herein above with the description of the first module 101. Box 614 is shown to underscore that various other types of analysis can be performed. For example, an analysis of wafer recipe processes can be analyzed.

At operation 616, a monitoring system, or an engineer, can assess potential root causes, such as a bad recipe process in the case of semiconductor wafer fabrication and testing. Machine learning can be used to enhance the assessment of potential root causes, with a monitoring system being trained, for example, with historical data of WEMs and analysis.

At operation 618, if root causes are assessed, process tool recipes or controls can be modified by, for example, the third module 105. Certain recipes may be eliminated or modified, and in the case of target results, may be selected for additional fabrication of semiconductor wafers. The process ends at 620.

With regard to another process of the present disclosure, FIG. 7 is a flowchart 700 of a method of wafer asset modeling using language processing consistent with an illustrative embodiment. It is to be understood that the present disclosure is not limited to the operations of the method as described herein, and may be applied to other types of domains.

At operation 710, the first module 101 performs clustering of a plurality of wafer assets based on static properties, such as, for example, static data including one or more of a make, model, and manufacturing information of each of the wafer assets. In the case of a semiconductor wafer, other properties can be used a basis for clustering, including but not limited to, for example, functionality.

At operation 720, the second module 103 determines a rating of one or more of a plurality of assets having dynamic properties. For example, the operational data, sensor, and alarm data may be rated. The second module 103 shown in FIG. 1 may be configured to perform the asset determination. The second module 103 can be configured to determine whether the dynamic assets are "good", not good, or "bad" based on the conditional of operational properties (e.g., dynamic properties).

At operation 730, the third module 103 performs event prediction by converting numeric data generated by the plurality of assets to a natural language processing domain. The assets in a conversion operation can be both dynamic assets and static assets. Applications such as the Bag of Words (BOW), a term frequency-inverse document frequency (TF-IDF) application, or a word vectorization application are examples of applications that can be used to form the conversion of assets. The events/alarms can be converted to symbols in the language domain, which are used for word formation, and subsequently, sentence generation can be used for sequence generation to predict future alarms and events based on past patterns. With regard to FIG. 1, the third module 105 can perform the tasks in operations 730. FIG. 1 also shows a language processing module 120 (TF-IDF/BOW) that may store various language processing applications in conjunction with the third module 105 and perform additional language processing operations. At operation 730, the third module 105 may also perform sequence-to-sequence methods to predict alarms and events based on past patterns. As discussed hereinabove, the sequence-to-sequence methods may include a supervised learning algorithm that uses recurrent neural networks (RNN) and convolutional neural networks (CNN) to map a sequence in one domain to a sequence in another domain. The third module 105 can use the clusters generated by the first module 101 to aid in event predictions. The third module 105 can be used for an application that supports optimal process learning, and to diagnose problems in asset quality.

At operation 740, the event prediction information generated by operation 730 is provided to storage. Alternatively, or in addition, the event prediction information is provided to a monitoring application, Moreover, the event prediction information can be used for further analysis, such as a determination of root causes. The predicting of alarms can be performed by using word embeddings for alarm data, such as word2vec to capture a similarity in alarms. Based on alarms occurring at sequential timestamps, a bucketing of a source and target sequences can be performed. The use of the sequence of alarms from a reference window to predict a sequence of alarms in a target window in the future can be performed using sequence-to-sequence methods. The language generated can incorporate the cluster/group being identified using static data as a prefix to alarm tokens.

Although the process 700 ends after operation 740, there can be additional operations performed. For example, the third module 105 can create a word embedding model by converting the numeric data from a semiconductor domain to the NLP domain, and determine a rating of a plurality of semiconductor wafers according to a recipe process. As shown and discussed with regard to FIGS. 2A, 2B herein above, the event prediction information can be used to identify groups of process IDs of the semiconductor wafers, or recipes, that have desired qualities. Thus, the wafers can be determined to be "good" or "bad" based on whether a certain recipe process is good, or bad for an application.

Figure 8:
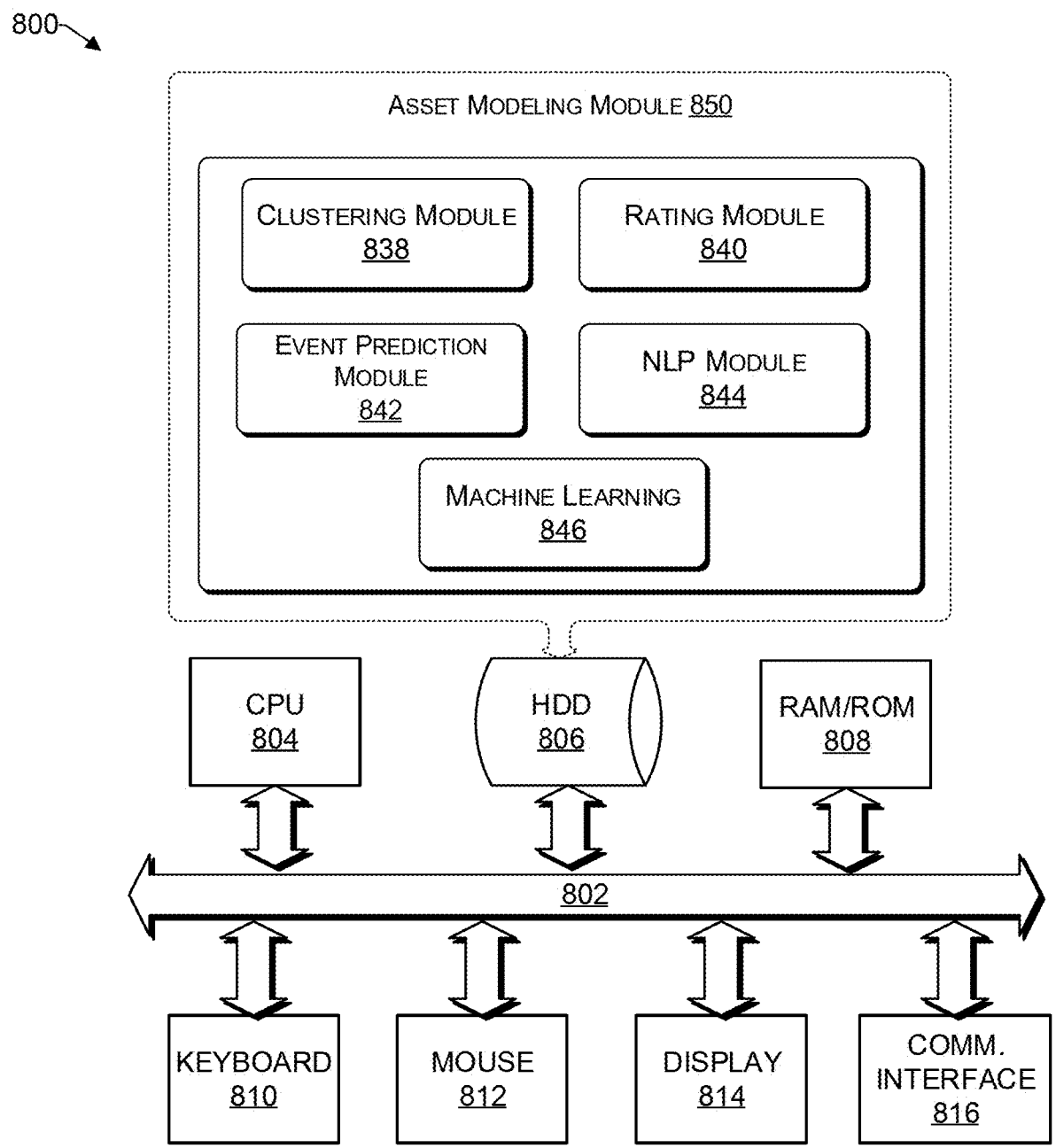
FIG. 8 is a functional block diagram illustration of a computer hardware platform that can communicate with various networked components, consistent with an illustrative embodiment.

FIG. 8 provides a functional block diagram illustration 800 of a computer hardware platform. In particular, FIG. 8 illustrates a particularly configured network or host computer platform 800, as may be used to implement the methods shown in FIGS. 6 and 7.

The computer platform 800 may include a central processing unit (CPU) 804, a hard disk drive (HDD) 806, random access memory (RAM) and/or read-only memory (ROM) 808, a keyboard 810, a mouse 812, a display 814, and a communication interface 816, which are connected to a system bus 802. The HDD 806 can include data stores.

In one embodiment, the HDD 806, has capabilities that include storing a program that can execute various processes, such as for executing an asset modeling module 850, in a manner described herein. The asset modeling module 850 provides the overall management of the selected models for asset modeling using language processing. A clustering module 848, which may function as the first module 101 shown and described in FIG. 1, is configured to cluster static data, or various snapshots of historical data of what was at one-time dynamic operations. A rating module 840, which may function as the second module 103 shown and described in FIG. 1, can be configured to rate certain semiconductor recipes as good, or bad, based on criteria discussed herein above in conjunction with FIGS. 2A, 2B, 3, and 4. An event prediction module 842, which may function as the third module 105 shown and described in FIG. 1, can be configured to predict future events or alarms, and convert numerical sensor and operational data to a language domain by performing a sequence-to-sequence method. A Natural Language Processing module 844 may operate in conjunction, for example, with the event prediction module 842. The events/alarms can be converted to symbols in the language domain, which are used to form words and subsequently sentences used for sequence generation to predict future alarms and events based on past patterns. A machine learning module 846 can be trained with training samples of historical data that can be used to increase the accuracy of the operation of the other modules, particularly in predicting events/alarms and in rating whether a particular recipe. (and a group of semiconductor wafers fabricated according to that recipe) are good or bad, or close to an ideal or goal set of measurements of a semiconductor wafer, without necessarily making such measurements. There can be various modules configured to perform different functions that can vary in quantity.

For example, the training sample module 842 stores various data to train the processor with a machine learning module 840 configured to perform machine learning regarding workload management including determining reconciliation time and reconciliation periods for each of identified operations as discussed herein above.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

Example Cloud Platform

As discussed above, functions relating to environmental and ecological optimization methods may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 9:
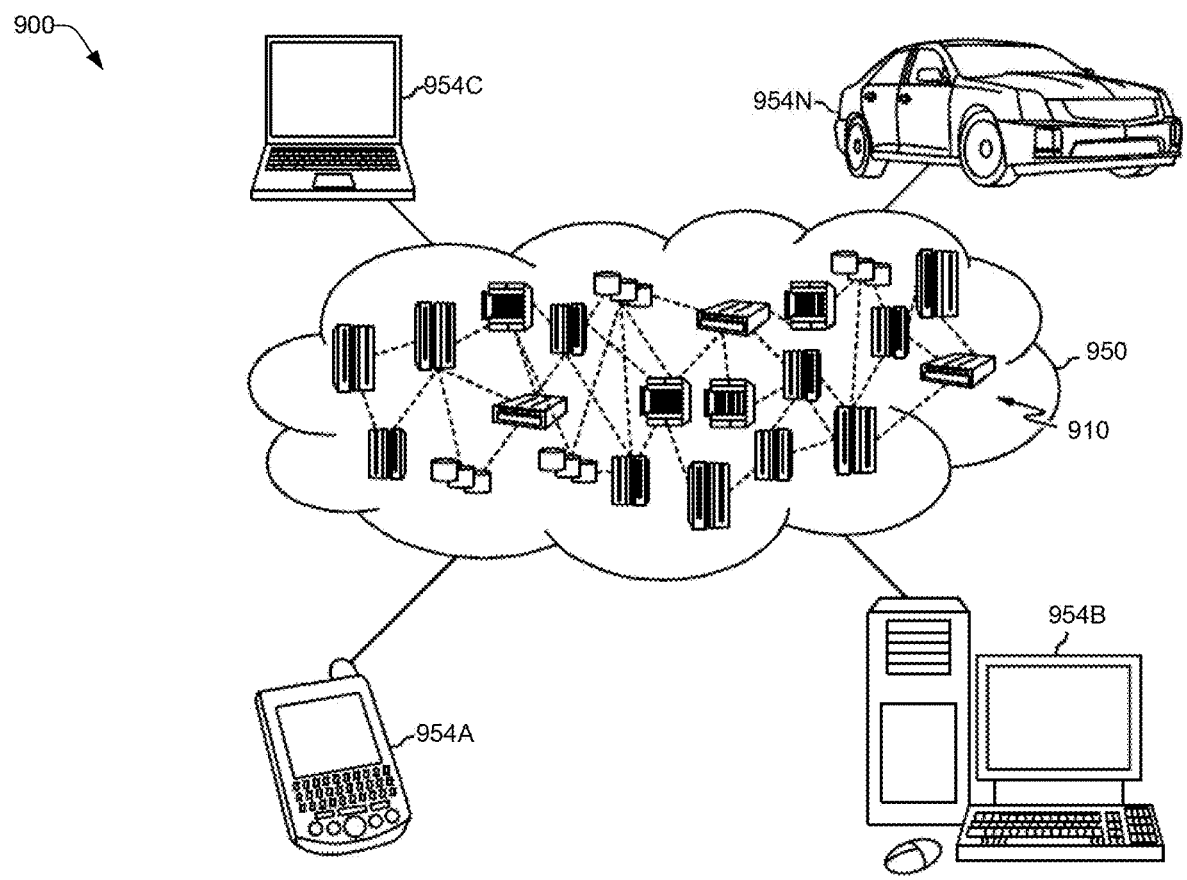
FIG. 9 depicts an illustrative cloud computing environment utilizing cloud computing.

Referring now to FIG. 9, an illustrative cloud computing environment 900 utilizing cloud computing is depicted. As shown, cloud computing environment 900 includes cloud 900 having one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms, and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
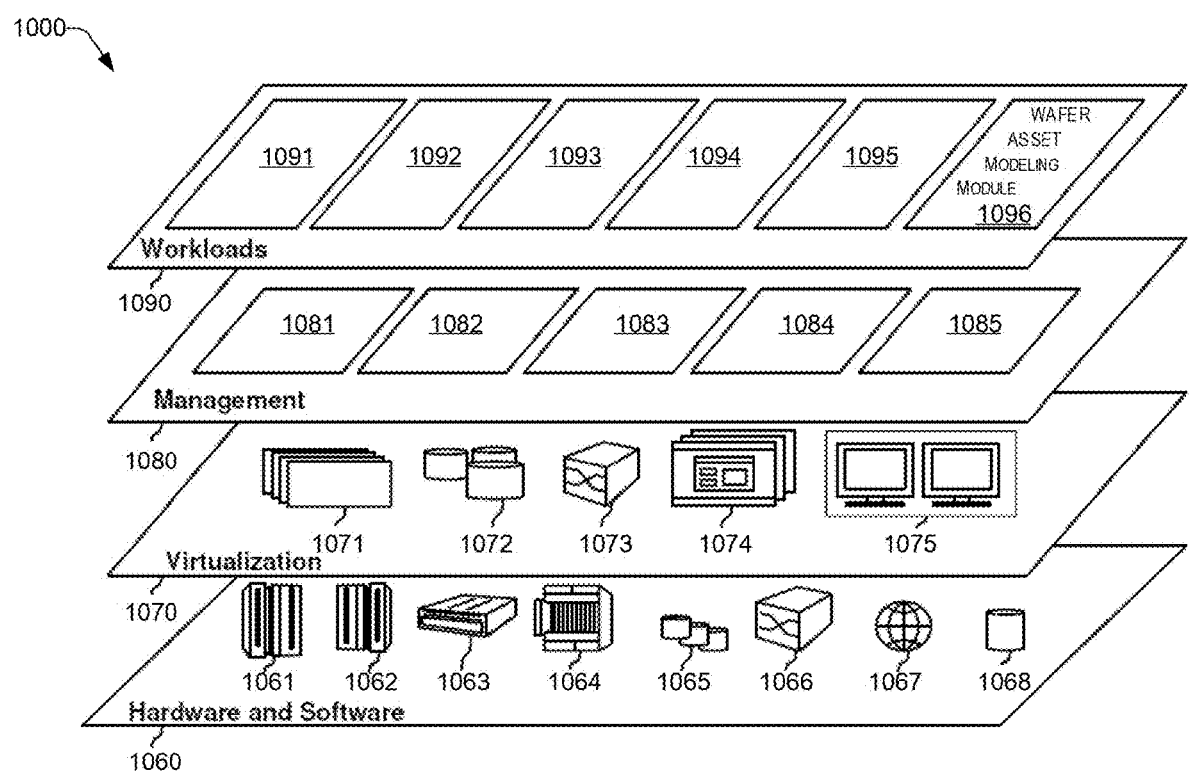
FIG. 10 depicts a set of functional abstraction layers provided by a cloud computing environment.

Referring now to FIG. 10, a set of functional abstraction layers 1000 provided by cloud computing environment 900 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 include hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a wafer asset modeling model 1096 to perform event prediction and identify semiconductor wafer production recipes, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device for content and programming coupled to the processor;
   a wafer asset modeling module stored in the storage device, wherein an execution of the wafer asset modeling module by the processor configures the computing device to perform acts comprising:
   identifying and clustering a plurality of assets based on static properties of a wafer asset using a first module of the wafer asset modeling module;
   determining a rating of one or more assets of the clustered plurality of assets based on dynamic properties of the wafer asset by a second module of the wafer asset modeling module;
   performing an event prediction by converting a numeric data of the clustered plurality of assets to a natural language processing (NLP) domain by a third module of the wafer asset modeling module;
   performing one or more sequence-to-sequence methods to predict a malfunction of a component of the wafer asset and/or an event based on past patterns, by the third module of the wafer asset modeling module; and
   providing the event prediction information and storing in the storage device.

2. The computing device according to claim 1, wherein:
   the static properties of the assets comprise static data including one or more of a make, model, or manufacturing information of each of the assets;
   the dynamic properties of the assets comprise dynamic data including one or more of operational data, sensor data, or alarm data; and
   the third module is configured to convert one or more of the static data and the dynamic data to the NLP domain by finding word representations using at least one of a Bag-of-Words model, a term frequency-inverse document frequency (TF-IDF), or a word vectorization.

3. The computing device according to claim 1 wherein the numeric data is converted from an Internet of things (IoT) domain to the NLP domain by creating a word embedding model of the numeric data performing at least one of a cluster analysis, a difference measurement analysis, or a predictive model development.

4. The computing device according to claim 1, wherein the rating of the one or more assets determined by the second module comprises a description based on a conditional characteristic.

5. The computing device according to claim 1, wherein the numeric data is converted from a semiconductor domain to the NLP domain by creating a word embedding model of the numeric data of a semiconductor wafer fabrication, and wherein the second module is configured to determine a rating of a plurality of semiconductor wafers according to a recipe process.

6. The computing device according to claim 5, wherein the word embedding model of the numeric data is created using at least one of a Bag-of-Words (BOW) model, a term frequency-inverse document frequency (TF-IDF), or a word vectorization.

7. The computing device according to claim 6, wherein one or more of the plurality of semiconductor wafers are rated as one of good or bad according to the determined rating of the recipe process.

8. The computing device according to claim 7, wherein:
   the third module is further configured to use the BOW model to create the word embedding model of the numeric data by determining BOW vectors based on creating rows and columns of the numeric data, and
   each row represents a semiconductor wafer, and each column represents a count of a particular recipe that is identified as being used in a respective wafer.

9. The computing device according to claim 7, wherein:
   the third module is further configured to use the TF-IDF to create the word embedding model of the numeric data based on creating rows and columns of the numeric data,
   each row represents a semiconductor wafer, and each column represents a count of a particular recipe that is identified as being used in a respective wafer, and
   a numerical value is assigned to each recipe according to a uniqueness of the recipe compared to other recipes used.

10. A computer-implemented method for wafer asset modeling, the method comprising:
    clustering a plurality of wafer assets based on static properties of a wafer comprising static data including at least one of a make, a model, or a manufacturing information of each of the wafer assets;
    determining a rating of one or more assets of the plurality of clustered wafer assets based on dynamic properties, wherein the dynamic properties comprise dynamic data including one or more of operational data, sensor data, or alarm data;
    predicting a target event or a failure event by converting a numeric data of the plurality of clustered wafer assets to a natural language processing (NLP) domain; and
    performing one or more sequence-to-sequence methods to predict alarms and target events based on past patterns.

11. The computer-implemented method according to claim 10, further comprising converting one or more of the static data and the dynamic data to the NLP domain by finding word representations using at least one of a Bag-of-Words model, a term frequency-inverse document frequency (TF-IDF), or a word vectorization.

12. The computer-implemented method according to claim 10, wherein converting the numeric data is performed from an Internet-of-things (IoT) domain to the NLP domain by creating a word embedding model of the numeric data performing at least one of a cluster analysis, a difference measurement analysis, or a predictive model development.

13. The computer-implemented method according to claim 10, further comprising: determining the rating of the one or more of the plurality of wafer assets based on a conditional characteristic.

14. The computer-implemented method according to claim 10, wherein:
the wafer asset comprises a plurality of semiconductor wafers, and
the method further comprises:
creating a word embedding model by converting the numeric data from a semiconductor domain to the NLP domain; and
determining a rating of a plurality of semiconductor wafers according to a recipe process.

15. The computer-implemented method according to claim 14, further comprising:
creating the word embedding model of the numeric data by using at least one of a Bag-of-Words (BOW) model, a term frequency-inverse document frequency (TF-IDF), or a word vectorization.

16. The computer-implemented method according to claim 15, further comprising:
creating the word embedding model of the numeric data by the BOW model includes determining BOW vectors by creating rows and columns, wherein each row represents a wafer, each column represents a count of a particular recipe that is identified as being used in a respective wafer.

17. The computer-implemented method according to claim 15, wherein:
creating the word embedding model of the numeric data by the TF-IDF includes creating rows and columns, and
each row represents a wafer, each column represents a count of a particular recipe that is identified as being used in a respective wafer, and
wherein a numerical value is assigned to each recipe according to a uniqueness of the recipe compared to other recipes used.

18. The computer-implemented method according to claim 14, further comprising:
rating one or more of the plurality of semiconductor wafers as one of good or bad according to the determined rating of the recipe process.

19. The computer-implemented method according to claim 18, further comprising: determining for each good wafer of the plurality of semiconductor wafers one or more closest wafers based on similar numerical values for each recipe of a plurality of recipes.

\* \* \* \* \*